Nov. 24, 1925.
O. MOOG
1,563,216
CAST ROLLER FOR MILLS
Filed Jan. 20, 1925
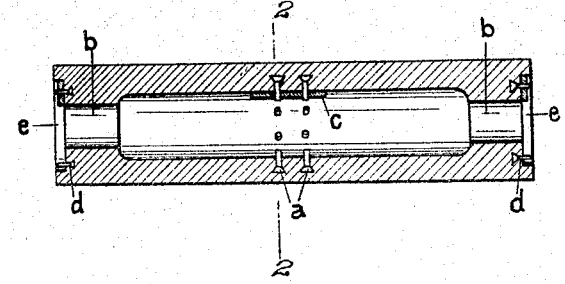
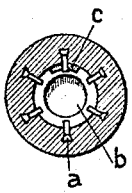
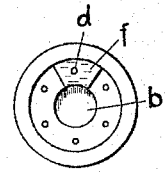
Inventor
Otto Moog
By
[signature]
Attorney Patented Nov. 24, 1925.

1,563,216

UNITED STATES PATENT OFFICE.

OTTO MOOG, OF BRUNSWICK, GERMANY, ASSIGNOR TO AMME, GIESECKE & KONEGEN, AKTIENGESELLSCHAFT, OF BRUNSWICK, GERMANY, A CORPORATION OF GERMANY.

CAST ROLLER FOR MILLS.

Application filed January 20, 1925. Serial No. 3,647.

*To all whom it may concern:*

Be it known that I, OTTO MOOG, a citizen of Germany, residing at Brunswick, Germany, have invented certain new and useful Improvements in Cast Rollers for Mills (for which I have filed applications in Germany, Jan. 23, 1924; Austria, Dec. 4, 1924; Switzerland, Dec. 5, 1924), of which the following is a specification.

My invention relates to improvements to cast rollers for mills, and more particularly in rollers used in grain mills, in mills for hard material, and the like. The object of the improvements is to provide a roller of cast metal with means to balance the masses of the roller during rotation of same so that the center of gravity of the mass and the geometrical center of gravity coincide. With this object in view, I provide the roller at suitable parts with means for securing balancing bodies thereto.

For the purpose of explaining the invention an example embodying the same has been shown in the accompanying drawing in which the same reference characters have been used in all the views to indicate corresponding parts. In said drawing, Fig. 1, is a longitudinal section of a roller embodying the invention, Fig. 2, is a section on the line 2—2 of Fig. 1, and Fig. 3, is an end view of the roller looking from the left in Fig. 1.

In order to balance the roller so that the center of gravity of the mass and the geometrical center of gravity coincide, I secure weighted bodies to such parts of the roller as have been ascertained by known methods to require such balancing. Now, such weighted bodies cannot be secured to the outer circumference or end faces of the roller, because the rollers must have smooth outer surfaces. Further, it is difficult to secure the weighted bodies in position where the rollers are made from chilled cast iron, since such rollers cannot easily be bored for securing bolts or the like thereto. For these reasons I cast the roller with internal lugs adapted to have the weighted bodies secured thereto, and in the preferred embodiment of the invention I embed the heads of rivets or bolts $a$ of soft iron in the body of the roller when the roller is cast.

In the example two sets of rivets $a$, are shown as arranged around the circumference of the bore of the roller, each set comprising six rivets. After the roller has thus been manufactured with the rivets cast in the body thereof, I ascertain at what parts a weighted body or weighted bodies must be secured thereto, and what should be the wight of the said bodies, and I secure the said body or bodies $c$ to the proper rivet or rivets by passing the same into the bore $b$ provided for the shaft. If one weighted body is needed I provide the same with one or more bores which align with the rivet or rivets at the point where such weights or weight is to be secured, and I fix the same in position by upsetting the ends of rivets, or by welding the ends of the rivets to the weighted bodies.

After thus balancing the roller in order that it may be placed in any position on a horizontal plate without rolling thereon, there may be other irregularities in the distribution of the masses which can only be observed when the roller is mounted in the mill and rapidly rotated. Such irregularities are caused by uneven distribution of the masses at opposite ends of the axis. In this case a couple is produced by the rotation which tends to turn the roller about a transverse axis which constantly changes its direction. This irregularity is ascertained by known methods and compensated by securing weighted bodies to suitable parts of the roller. In such case, as shown in Figs. 1 and 3, a series of lugs $d$ are provided at each of the opposite ends of the roller, which lugs are formed preferably by rivets secured to the roller when the roller is cast. Preferably the roller is formed with a recess $e$ in each of its opposite ends, and the rivets project from the bottoms of the recesses in which they are secured to points within the planes passing through the outer end faces of the roller, so that none of the rivets projects beyond the said end faces. To the said lugs or rivets weighted bodies $f$ in the form of segments or arcs are secured, riveting being preferred to welding, for securing said weighted bodies to the rivets because the rivets are accessible at the ends of the rollers. Preferably the rivets which are not required for fixing weighted bodies in position are broken off, and the reduction of the mass of the roller caused thereby must be considered when ascertaining the volume of the weighted bodies.

While in describing the invention reference has been made to a particular example embodying the same, I wish it to be understood that I do not limit myself to the construction shown in the drawing.

I claim:

1. Cast roller for grain mills, for mills for hard material, and the like, comprising a roller having its axial bore enlarged between points adjacent its opposite ends and having rivets cast into its body with their ends projecting radially into said enlarged bore and adapted to have weighted bodies secured thereto for balancing the roller.

2. Cast roller for grain mills, for mills for hard material, and the like, formed with an axial bore and having rivets cast into its inner wall and projecting radially into said bore, said rivets adapted to have weighted bodies secured thereto for balancing the roller.

3. Cast roller for grain mills, for mills for hard material, and the like, having recesses in its end faces and having rivets cast therein and projecting from the bottoms of said recesses to points within the planes passing through the end faces of the rollers, said rivets being adapted to have weighted bodies secured thereto for balancing the roller.

In testimony whereof I have affixed my signature.

Dr.-Ing. OTTO MOOG.